United States Patent [19]
Garland et al.

[11] Patent Number: 5,724,614
[45] Date of Patent: Mar. 3, 1998

[54] CIRCUITS PROVIDE INPUT/OUTPUT MODULE CONNECTIONS HAVING THE INPUT RECEPTACLE BEING CONNECTED TO NEUTRAL WIRING TERMINAL AND THE OUTPUT RECEPTACLE BEING CONNECTED TO HOT WIRING TERMINAL

[75] Inventors: Milton Ward Garland, Waynesboro; Arthur James Marshall, Gettysburg; John Anthony Ecton, Jr., Greencastle, all of Pa.

[73] Assignee: Frick York International, Waynesboro, Pa.

[21] Appl. No.: 541,974

[22] Filed: Oct. 10, 1995

[51] Int. Cl.⁶ .................................................. G06F 13/00
[52] U.S. Cl. .................... 395/863; 395/821; 395/832; 395/893; 361/636; 361/640
[58] Field of Search .......................... 317/118; 361/394, 361/380, 393, 636, 640; 339/75 R; 395/863, 821, 832, 893

[56] References Cited

U.S. PATENT DOCUMENTS

| | | | |
|---|---|---|---|
| 3,942,077 | 3/1976 | Powers | 317/118 |
| 4,215,386 | 7/1980 | Prager et al. | 361/394 |
| 4,247,882 | 1/1981 | Prager et al. | 361/380 |
| 4,477,862 | 10/1984 | Gonzales | 361/393 |
| 4,558,914 | 12/1985 | Prager et al. | 339/75 R |

*Primary Examiner*—Dinh C. Dung
*Assistant Examiner*—David Ton
*Attorney, Agent, or Firm*—Dowell & Dowell

[57] ABSTRACT

A digital input/output circuit board includes a plurality of circuits each having an input module and an output module for mounting either an input module or an output module, wiring terminals for attaching field wires to electrically connect the circuit board to field devices, a hot wiring terminal for attaching a hot power wire, and a neutral wiring terminal for attaching a neutral power wire. A computer connected to the circuit board receives input signals indicating the state of the field devices and sends output signals to activate other field devices.

4 Claims, 5 Drawing Sheets

CIRCUITS PROVIDE INPUT/OUTPUT MODULE CONNECTIONS HAVING THE INPUT RECEPTACLE BEING CONNECTED TO NEUTRAL WIRING TERMINAL AND THE OUTPUT RECEPTACLE BEING CONNECTED TO HOT WIRING TERMINAL

BACKGROUND OF THE INVENTION

1. Field of the Invention

The invention relates generally to the field of circuit boards and, more particularly, to a digital input/output circuit board.

2. Discussion of the Related Art

Solid state input/output (I/O) systems are known for converting 5 volt DC switching signals internal to a microprocessor or computer to 120 volt AC switching signals. Such I/O systems enable a microprocessor or computer to receive input signals indicating the state of 120 volt switches via input modules, and to send output signals to activate external 120 volt devices via output modules. The known I/O systems enable microprocessors and computers to be utilized to control various devices in household and industrial settings.

The known I/O systems typically include a base circuit board having a plurality of receptacles for mounting input and output modules, a connector for interfacing to a computer or microprocessor, a terminal strip for attaching field wires to field devices, and a fuse associated with each module. The base circuit boards conventionally have from one to thirty-two or more receptacles for mounting a selected number of modules. An input or an output module may be plugged into each receptacle position on a circuit board.

The known I/O circuit boards have a number of associated disadvantages. First, the microprocessor or computer must have information as to whether a particular module position on the circuit board is occupied by an input or an output module. Accordingly, whenever the status of a module position changes, the information must be updated.

Secondly, the terminal strip must be wired for the proper configuration of each mounted input or output module. Companies which manufacture large numbers of microprocessor or computer controlled equipment utilizing I/O module systems incur substantial labor costs related to the wiring of the terminal strips. I/O boards having a large number of modules require extensive wiring on the terminal strip to configure the modules. Moreover, if a design change is made which requires the status of multiple module positions to be changed from input to output or vice versa, the terminal strip must be rewired in a time-consuming and tedious process.

SUMMARY OF THE INVENTION

The present invention has been made in view of the above-described disadvantages of the known I/O circuit boards and has as an object to provide a digital input/output circuit board which reduces manual wiring time and expenses.

Another object of the present invention is to provide a digital I/O circuit board which provides flexibility of module selection and configuration.

Yet another object of the present invention is to provide a digital I/O circuit board which complies with UL and CSA specifications.

Still another object of the present invention is to provide a digital I/O circuit board which reduces reconfiguration time and expenses.

Additional objects and advantages of the present invention will become apparent from the detailed description which follows and the accompanying drawings. To achieve the objects of the invention, as embodied and broadly described herein, the digital input/output circuit board in accordance with a preferred embodiment of the invention comprises a plurality of circuits, each of which includes an input receptacle for mounting an input module and an output receptacle for mounting an output module. The circuits are electrically connectible to a computer.

A plurality of wiring terminals are provided for attaching field wires to electrically connect the circuits to field devices. The field devices may send input signals to the computer to indicate their state, or receive output signals from the computer to cause their activation.

The circuit board further comprises a hot wiring terminal for attaching a hot power wire, and a neutral wiring terminal for attaching a neutral power wire.

A method of connecting the digital I/O circuit board to field devices is also described herein.

DETAILED DESCRIPTION OF THE PREFERRED EMBODIMENT

Figure 1:
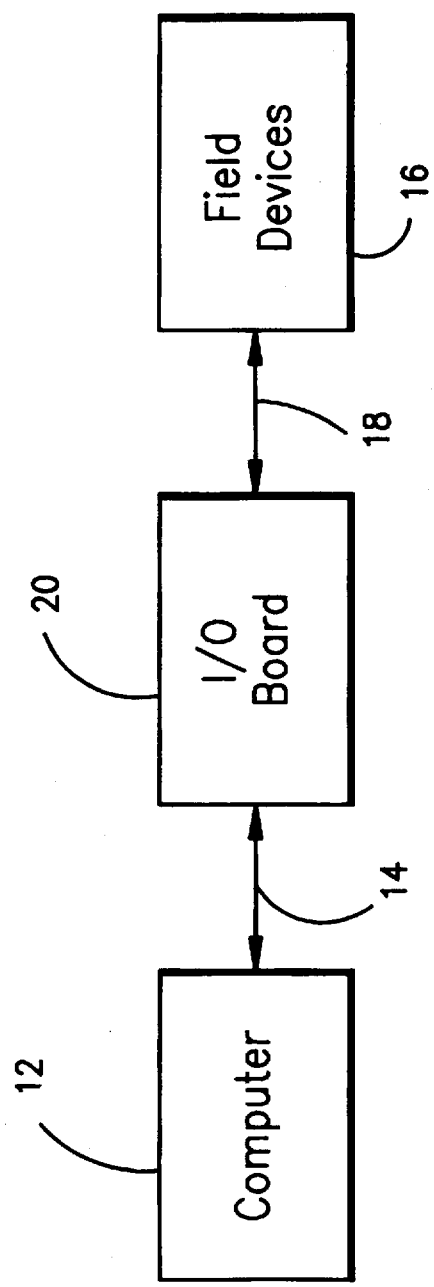
FIG. 1 is an illustrational flow diagram of the manner of use of the I/O circuit board in accordance with the invention.

The preferred embodiment of the invention will now be described in detail with reference to the drawing figures in which common reference numbers identify common elements.

FIG. 1 is a flow diagram of the manner of use of a conventional I/O circuit board 20 (and also the I/O circuit board in accordance with the present invention). As shown, the circuit board 20 is electrically connected to a computer 12 via a connector 14 and to one or more field devices 16 via field wiring 18. The computer receives input return signals from the field devices indicating their present state, and sends output signals to activate other field devices referred to herein as "loads". For example, the input return signals may be received from electrical switches indicating an "opened" or a "closed" state, or from other types of devices indicating their operating status as being either "on" or "off". The output signals may be sent to loads including motors, solenoids, contactors and the like, to activate contacts and energize the devices.

Figure 2:
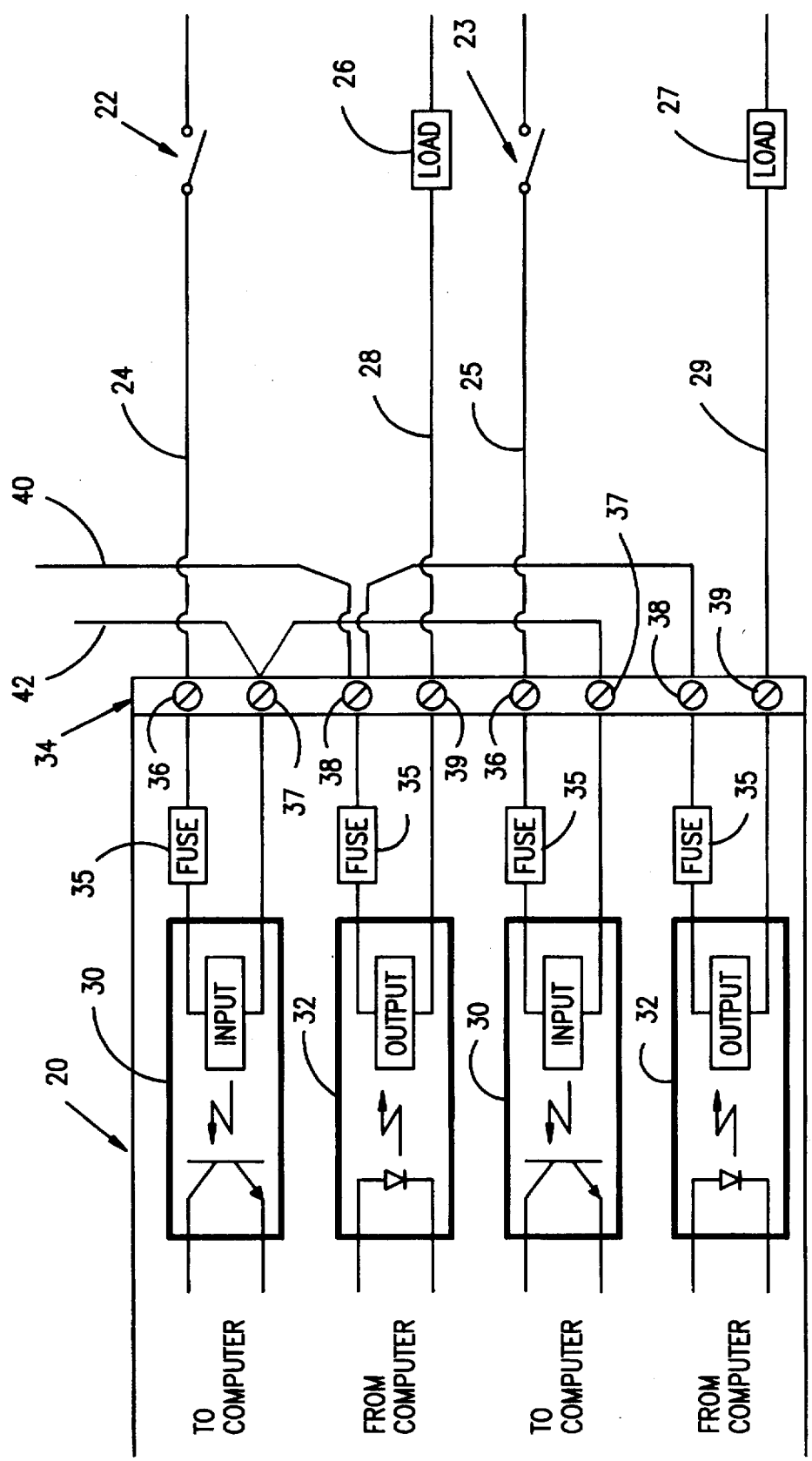
FIG. 2 is a schematic view of a conventional I/O circuit board to which is mounted a plurality of input and output modules connected to field devices.

FIG. 2 schematically illustrates the electrical connection of the conventional I/O circuit board 20 to a pair of switches 22, 23 via field wiring 24, 25, and to a pair of loads 26, 27 via field wiring 28, 29.

Input modules 30 and output modules 32 are shown removably mounted to the circuit board and being electrically connected to the field devices. The conventional circuit board may have as many as thirty-two or more locations for mounting modules, and an input or an output module may be mounted at any of these locations. The input modules 30 are electrically connected to a computer and to the switches 22, 23 to enable the computer to read the state of the switches, and the output modules 32 are electrically connected to the computer and to the loads 26, 27 to enable the computer to send output signals to selectively energize the loads. Any combination of input modules and output modules may be utilized on the circuit board depending on the number of switches or loads.

The circuit board 20 further comprises a fuse 35 for each module 30, 32, and a screw terminal strip 34 having a pair of wiring terminals 36, 37 and 38, 39 for each of the modules 30, 32, respectively. The terminal strip is provided for electrically connecting the field wiring to the field switches 22, 23 and loads 26, 27. For the input modules 30, field wires 24, 25 connect the respective switches 22, 23 to the terminals 36. The other terminal 37 for each input module is connected to a neutral power wire 42. For each of the output modules 32, field wires 28, 29 connect the respective loads 26, 27 to the terminals 39. The other terminal 38 for the output modules is connected to a hot power wire 40.

Figure 3:
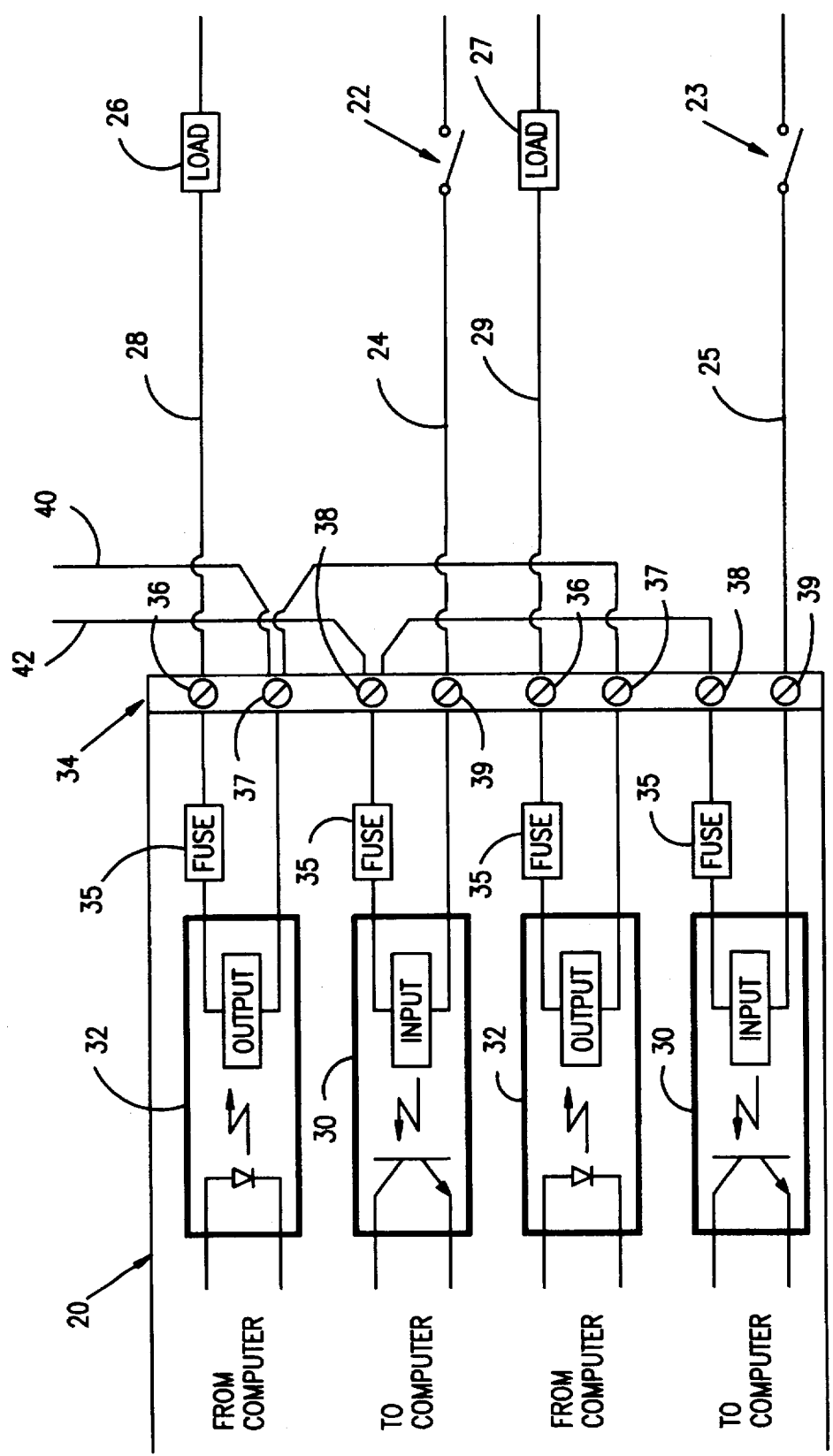
FIG. 3 illustrates the conventional I/O circuit board of FIG. 2 with the modules mounted at reversed positions to demonstrate the labor intensive wiring changes required for reconfiguration.

FIG. 3 illustrates the conventional I/O circuit board 20 of FIG. 2 electrically connected to the loads 26, 27 and switches 22, 23 arranged at reversed positions. The module arrangement of FIG. 3 is reversed so that the input modules 30 are connected to the switches and the output modules 32 are connected to the loads. As shown, the reconfiguration of the modules requires significant rewiring of the terminal strip 34 to connect the neutral power wire 42 to the input modules 30 and the hot power wire 40 to the output modules 32, and the field wires 24, 25, 28 and 29 to the proper terminals on the terminal strip.

Figure 4:
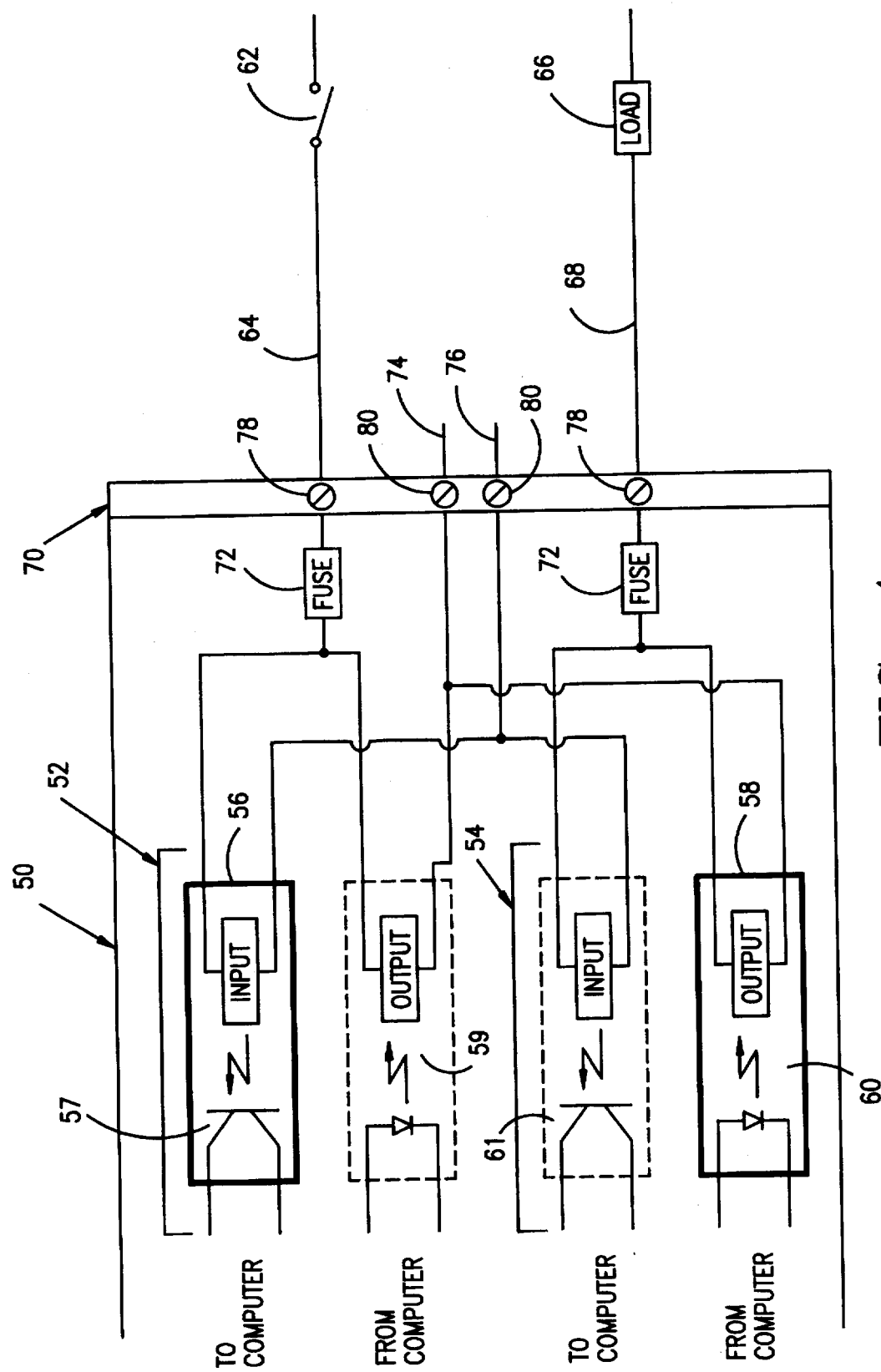
FIG. 4 is a schematic view of an I/O circuit board in accordance with a preferred embodiment of the invention.

FIG. 4 schematically depicts an I/O circuit board 50 in accordance with a preferred embodiment of the invention. The circuit board comprises two circuits 52 and 54. Each circuit includes two module receptacles and associated electrical wiring to the terminal strip 70. One receptacle receives only input modules and the other receives only output modules. In circuit 52, an input module 56 is mounted to the input receptacle 57 and the output receptacle 59 is vacant as represented in dotted line. In circuit 54, an output module 58 is mounted to the output receptacle 60 and the input receptacle 61 is vacant. The circuit board may optionally have a different number of circuits than the two shown.

The modules 56, 58 are removably mounted to the circuit board 50 and connected to field devices. The field devices may be loads or devices providing input signals such as switches.

The circuit board 50 is electrically connected to a computer such as shown in FIG. 1. The input module 56 is electrically connected to the computer and to a switch 62 via field wiring 64 to enable the computer to receive input signals to read the state of the switch. The output module 58 is electrically connected to the computer and to a load 66 via field wiring 68 to enable the computer to send output signals to activate the load.

As shown, an insulated fuse 72 is provided for each of the circuits 52 and 54. Hot power wiring 74 and neutral power wiring 76 are connected to the output module 58 and the input module 56, respectively.

The circuit board 50 integrates the hot and neutral wiring used to configure the input and output modules and reduces the amount of time and labor required to wire the terminal strip 70. The circuit board provides flexibility and ease of reconfiguring the modules for different arrangements of field devices, and reduces the number of terminals required for field wiring purposes by significantly reducing the number of wiring terminals associated with the terminal strip 70. Particularly, there is only one terminal 78 for each circuit 52, 54 and one power terminal 80 for each of the hot wiring 74 and the neutral wiring 76. Thus, for the two circuits and four module receptacles use a total of four wiring terminals as compared to the eight terminals in the conventional circuit board 20. For circuit boards in accordance with the invention having additional circuits, the reduction in the number of terminals as compared to the conventional circuit boards is even greater. For example, a circuit board in accordance with the invention having six circuits and twelve module receptacles for connecting as many as six field devices (not shown) includes eight terminals, while a conventional circuit board having six module receptacles (not shown) requires twelve terminals. Reducing the number of terminals significantly reduces the amount of time and cost of reconfiguring the circuit board for different combinations of field devices.

Figure 5:
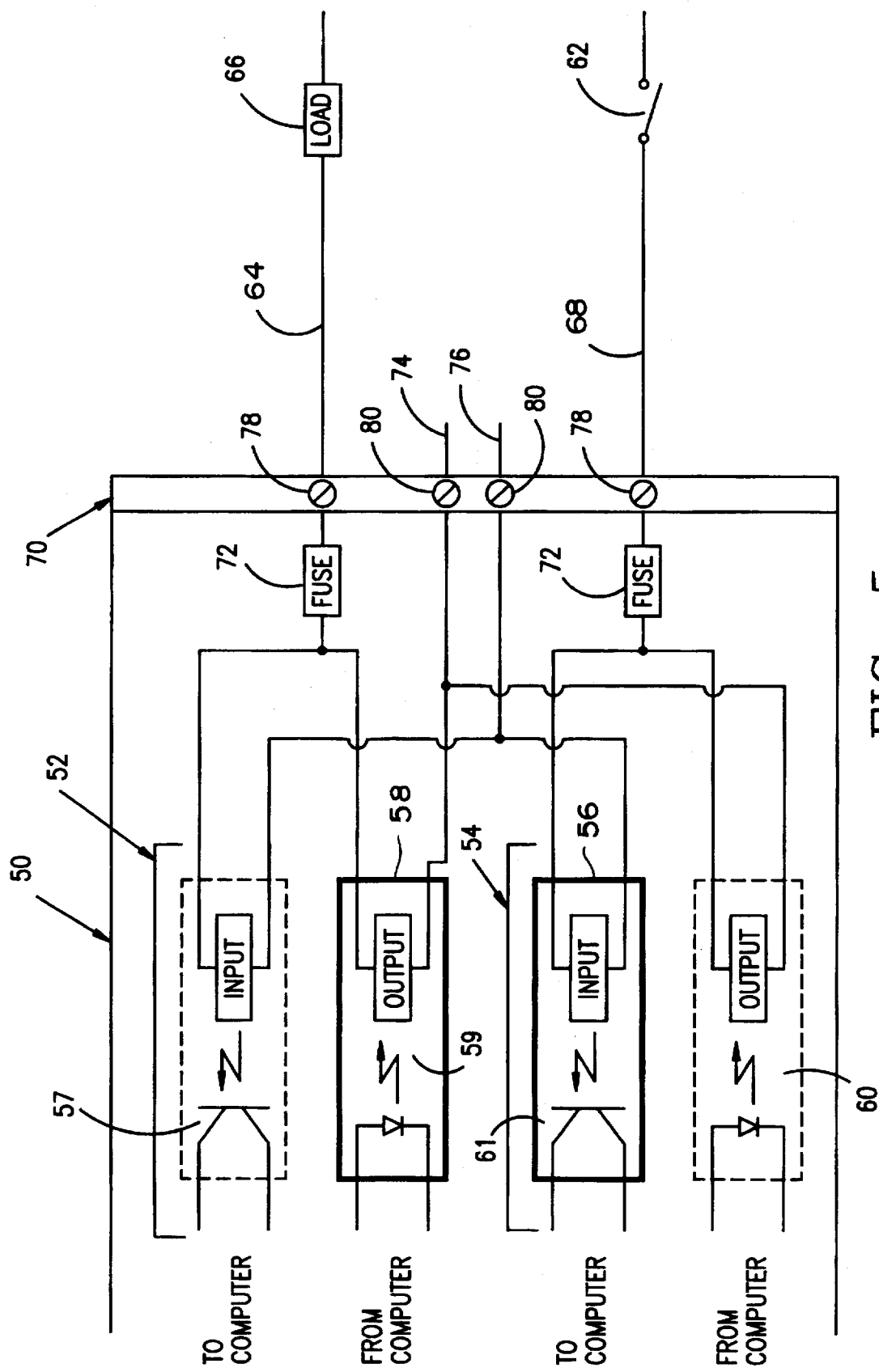
FIG. 5 illustrates the I/O circuit board of FIG. 4 with the modules mounted at reversed positions to demonstrate the ease of reconfiguration.

The advantages of the present invention can be better appreciated by referring to FIG. 5 which illustrates the circuit board 50 electrically connected to the field devices arranged at reversed positions as compared to FIG. 4. The module arrangement of FIG. 5 is also reversed so that the input module 56 is mounted at the receptacle 61 of circuit 54 and connected to the switch 62, and the output module 58 is mounted at the receptacle 59 of circuit 52 and connected to the load 66. Comparing FIGS. 4 and 5, the reconfiguration of the modules requires only that, for each circuit, one type of module be removed and the other type be mounted at the proper receptacle. The hot wiring 74 and neutral wiring 76 is automatically connected to the rearranged modules without having to configure the module wiring manually through the terminal 70.

The foregoing description of the preferred embodiment of the invention has been presented to illustrate the principles of the invention and not to limit the invention to the particular embodiment illustrated. It is intended that the scope of the invention be defined by all of the embodiments encompassed within the following claims and their equivalents.

What is claimed is:

1. A digital input/output circuit board for selectively electrically connecting a plurality of field devices to a computer so that the field devices either supply inputs to the computer through input modules or receive outputs from the computer through output modules, the input/output circuit board comprising:

a plurality of circuits, each of said circuits including an input receptacle for removably mounting an input module and an output receptacle for removably mounting an output module, and each said circuit being adapted to be electrically connected to a computer by way of one of the input and output modules;

a plurality of separate field wiring terminals electrically connected to said circuits, said field wiring terminals being adapted to attach to field wires to electrically connect said circuits to separate field devices;

a common neutral wiring terminal adapted to attach to a neutral power wire, each said input receptacle being electrically connected to said neutral wiring terminal; and a common hot wiring terminal adapted to attach to a hot power wire, each said output receptacle being electrically connected to said hot wiring terminal.

2. The circuit board of claim 1, including a fuse element electrically connected between each of said separate field wiring terminals and said circuits.

3. A digital input/output circuit board for selectively electrically connecting a plurality of field devices to a computer so that the field devices either supply inputs to the computer through input modules or receive outputs from the computer through output modules, the input/output circuit board comprising:

at least one circuit, said at least one circuit including an input receptacle for removably mounting an input module and an output receptacle for removably mounting an output module, said at least one circuit being adapted to be electrically connected to a computer through either the input or output modules;

a field wiring terminal electrically connected to said at least one circuit, said field wiring terminal being adapted to attach to a field wire to electrically connect said at least one circuit to a field device;

a neutral wiring terminal adapted to attach to a neutral power wire, said input receptacle being electrically connected to said neutral wiring terminal; and a hot wiring terminal adapted to attach to a hot power wire, said output receptacle being electrically connected to said hot wiring terminal.

4. The circuit board of claim 3, including a fuse element electrically connected between said field wiring terminal and said at least one circuit.

* * * * *